Oct. 27, 1964

C. B. CROSS 3,154,188

ARTICLE FEEDING DEVICE FOR SUPPLYING GROUPS OF ARTICLES
TO PACKAGING INSTRUMENTALITIES

Filed July 26, 1962

INVENTOR.
Cedric B. Cross
BY Chapin + Neal
Attorneys

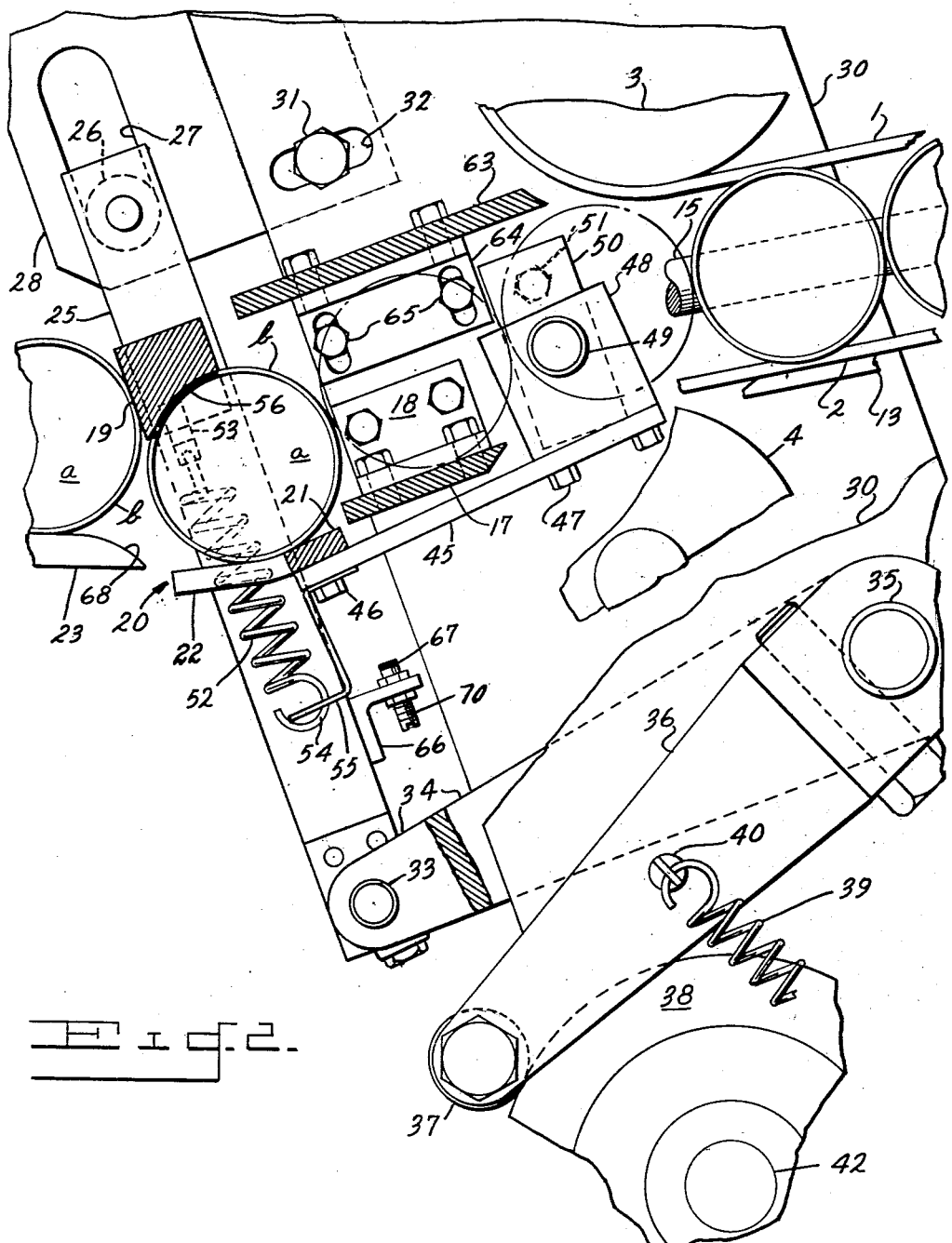

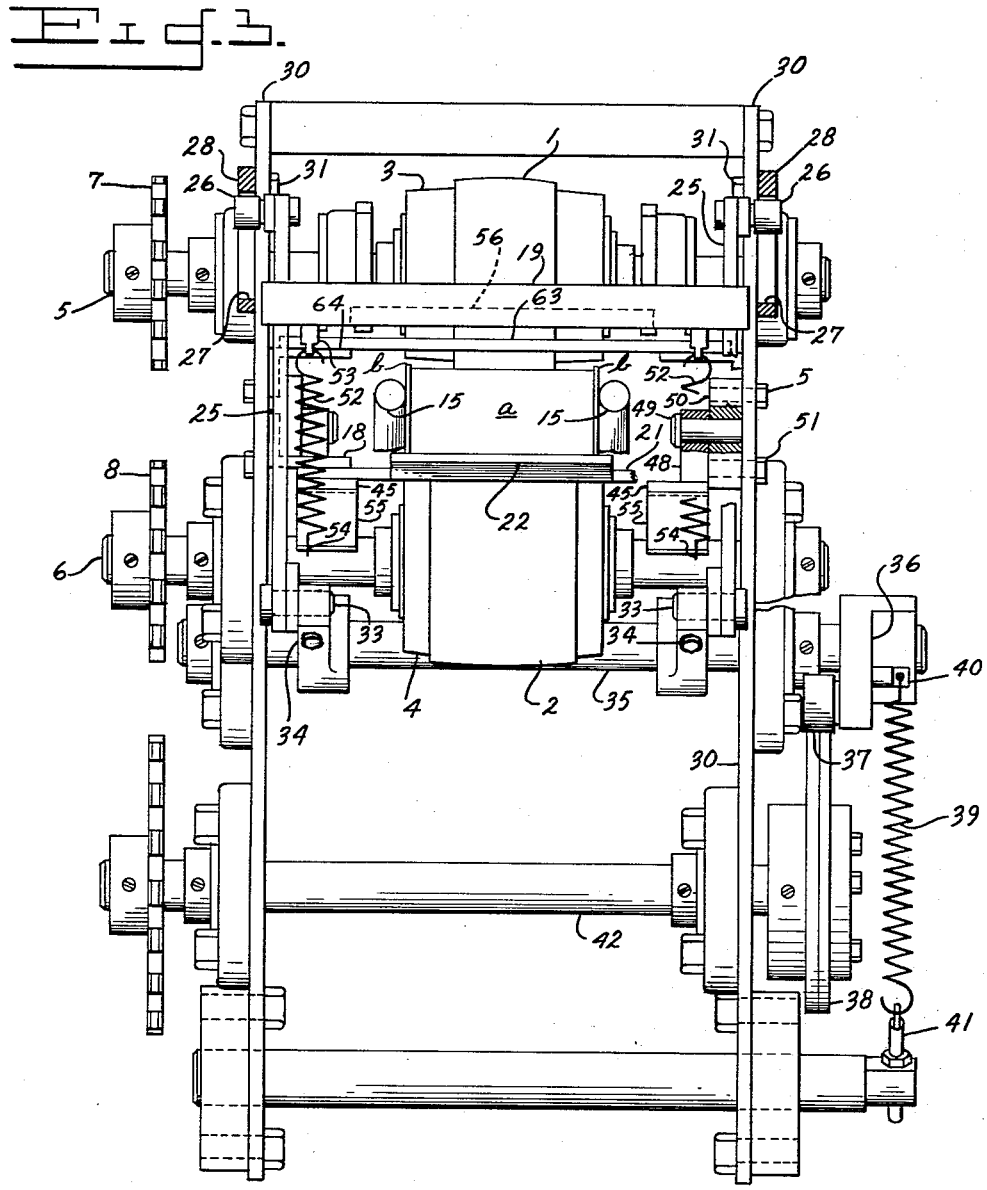

United States Patent Office 3,154,188
Patented Oct. 27, 1964

3,154,188
ARTICLE FEEDING DEVICE FOR SUPPLYING GROUPS OF ARTICLES TO PACKAGING INSTRUMENTALITIES
Cedric B. Cross, Monson, Mass., assignor to Package Machinery Company, East Longmeadow, Mass., a corporation of Massachusetts
Filed July 26, 1962, Ser. No. 212,652
9 Claims. (Cl. 198—34)

The present invention relates to improvements in mechanisms for feeding and assembling groups of cylindrical articles, and has particular utility in supplying groups of such articles to a wrapping machine or the like; however, the invention is not necessarily so limited in its field of use.

The overall object of the invention is to provde reliable means for feeding cylindrical articles in side-by-side contact, separating a predetermined number of articles from the leading end of the feed line and positioning the separated articles, as a group, at a transfer station from which the group is advanced by conveying means, operating in a direction transverse to the line of article feed, to wrapping or other mechanisms, and in greater particular to attain such ends in the feeding of articles having end flanges as the common "tin" can.

Another object is to accomplish the above ends in an economical manner and in a manner capable of high rates of operation.

The inventive concepts hereof are characterized by the general combination of a conveyor and means for feeding a line of cylindrical articles in side-by-side contact toward the conveyor at one side thereof. As herein taught, a gate adjacent the leading end of the article feeding means is disposed at one side of the conveyor. This gate comprises means for trapping and vertically displacing the leading article in the feeding means, after passage therefrom to the conveyor of the articles which make up the desired group, so as to facilitate the advance of the group by the conveyor.

The above and other related objects and features of the invention will be apparent from a reading of the following description of the disclosure found in the accompanying drawings and the novelty thereof pointed out in the appended claims.

In the accompanying drawings:

FIG. 2 is a fragmentary view of the structure as shown in FIG. 1 on a larger scale, showing the parts in a different position for advance of the article assembly to wrapping or other packaging instrumentalities; and FIG. 3 is an elevational view on line III—III of FIG. 1.

Figure 1:
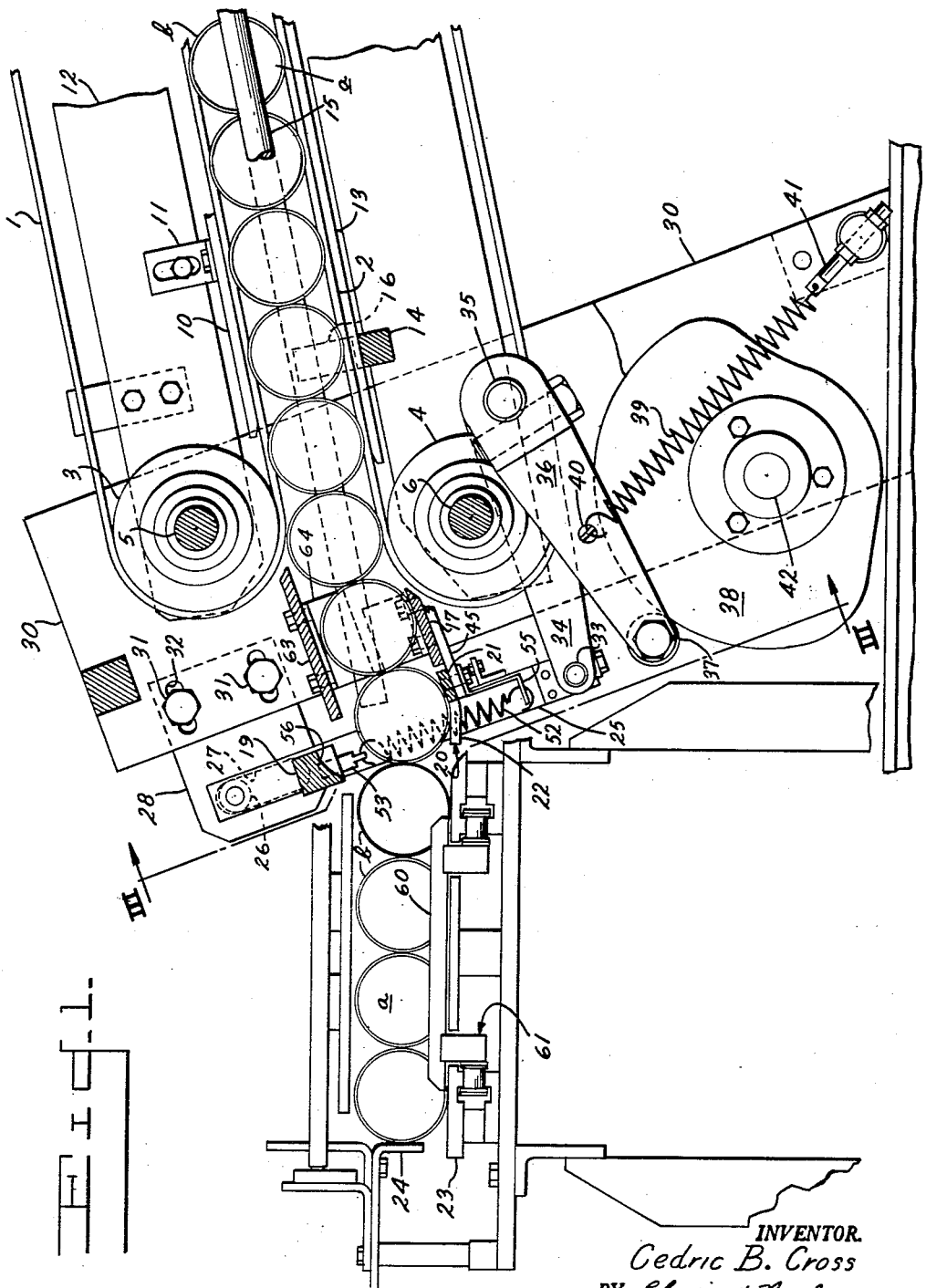
FIG. 1 is a fragmentary side elevational view, parts being broken away, of a device embodying the invention.

For purposes of illustration the articles indicated at $a$ are shown as cans having transversely extending end flanges $b$. The articles are fed from any suitable source of supply, not shown, between belts 1 and 2 trained around respective pairs of pulleys 3 and 4, only one of each pair being shown. As shown in FIG. 3, the pulleys 3 and 4 are fixed to respective shafts 5 and 6 powered in any suitable manner, as by respective sprockets 7 and 8 from any suitable source of power, not shown, for continuous movement of the belts, in the direction of the arrows, FIG. 1.

The lower run of belt 1 passes beneath a hold down plate 10 suitably and adjustably connected to the machine frame as by a plurality of slotted angle brackets, one of which is shown at 11, bolted to frame members 12. The upper run of belt 2 passes over a bedplate 13 supported on cross bars 14, one of which is shown in FIG. 1. As the articles are advanced by the belts 1 and 2 they are held in line by side guides 15 which engage the ends of the articles. Side guides 15 are supported from cross bars 14 as by angle brackets 16.

As the articles are delivered from the belts 1 and 2, they roll downwardly over a stationary inclined palte 17 (best shown in FIG. 2) secured as shown to angle brackets 18 bolted to opposed machine frame members 30.

In the absence of obstruction by a gate member, indicated at 19, later described, the articles pass as shown in FIG. 1 onto and over a depressible article supporting member generally indicated at 20 comprising a portion 21, which is normally aligned with member 17 and a lip portion 22 which is at an angle to portion 21 so as to direct the articles on a platform 23 and against an adjustable stop member 24 (FIG. 1), which also serves as a side guide for the conveyor means which feed the groups of cans to the wrapping or other instrumentalities. As the leading article engages stop member 24, the line of article is halted, the feed belts slipping on the articles. The width of the platform 23 is such as to accommodate the number of articles desired in the group which is to be advanced to the wrapping or other instrumentalities.

As the line of articles is halted by stop 24 the gate 19 is actuated to offset the article resting on support 20 downwardly with respect to the line of articles in the feeder and the group of articles assembled on platform 23.

The gate member 19 takes the form of a transverse bar secured to, and extending between, links 25 provided at their upper ends with rollers 26 which engage in guide slots 27 formed in brackets 28 adjustably secured to machine frame members 30 by bolts 31 extending through slots 32 in the frame members 30. The links 25 are pivoted at 33 to respective arms 34 fixed to a rock shaft 35 to which is secured an arm 36 provided on its free end with a cam roll 37. Cam roll 37 is held in contact with a cam 38 by spring 39 connected at one end to arm 36, as at 40, and the other end to the adjacent frame member 30, as at 41.

Cam 38 is fixed to a constantly driven cam shaft 42 provided with a sprocket 43 through which the shaft is driven from any suitable source of power, not shown.

As shown in FIG. 2, the depressible support 20 is carried by arms 45 each bolted at one end, as indicated at 46 in FIG. 2 to portion 21, the other end of arms 45 being bolted as at 47 to a block 48 freely pivoted on a stud 49 projecting from a plate 50, bolted as at 51, to the adjacent frame member 30.

The depressible support 20 is connected to gate 19 by springs 52 connected at their upper ends to the gate as at 53 and at their lower ends, as indicated at 54, to brackets 55 which are secured to portion 21 of support 20 by the bolts 46 which also secure arms 45 to support portion 21.

The gate 19 is recessed as shown at 56 to make an arcuate engagement with the underlying can.

As shown in FIG. 1, the gate 19 is in its uppermost position and a succession of cans have been advanced to position the four leading cans as a group on the platform 23 in the path of the flight 60 of an intermittently actuated conveyor generally indicated at 61, by which the group is transferred to wrapping or other packaging devices. When the gate 19 is in its highest position the depressible support 20 is held in alignment with plate 17 by engagement of arms 45 with the underside of plate 17 by the maximum tension of springs 52.

As the procession of cans is brought to a halt by stop member 24, the gate member 19 is lowered by cam 38 to engage the underlying can and move it and the depressible support 20 to the position shown in FIG. 2. In the latter position the leading can of the procession, that is, the gate-engaged can, is offset downwardly from the next adjacent can in the feed line and the trailing can of the group of platform 23. Preferably the displaced can is not only moved downwardly, but is also moved laterally away from the last can of the group as shown. It will be seen that the spacing between the stop member 24 and gate member 19 defines the number of cans in a group with the platform being of adequate width to provide the needed support. The now leading can of the line of cans is completely spaced from the separated group of cans so that the can flanges will not prevent any obstruction to the advance of the group of cans by the conveyor flight 60 which moves the group of cans towards the wrapping or packaging instrumentalities. It will also be noted that the gate member 19 functions as a component of the conveyor means by providing a side guide rail which cooperates with the stop member 24 to laterally confine the group of articles during their initial advance by the conveyor flight 60.

As the gate engaged can is moved downwardly there may be some tendency of the adjacent can in the halted feed line to be crowded upwardly and to maintain its proper alignment in the feed line a hold down plate 63 is provided above plate 17, and mounted on angle brackets 64 adjustably bolted to the machine side frames as indicated at 65, FIG. 2.

When the group of cans on platform 23 have been advanced sufficiently to clear the end of the halted feed line, the gate 19 is moved upwardly by cam 38, the support 20 and the can thereon being moved upwardly by spring 52 into realignment with the can feed line. To assure return of support 20 to realigned position, in the event the tension of spring 52 in any instance proves inadequate for the purpose, pins 70 (one being shown in FIG. 2), are adjustably threaded in angle brackets 66 secured to the links 25, are positioned to engage the ends of support portions 21 to positively return support 20 to the position of FIG. 1 upon upward movement of links 25. If found desirable, the upper ends of pins 70 may be provided with rubber or platsic tips 67. The pins 70 and brackets 66 have been omitted from FIG. 3 in the interest of clearness.

Preferably, the edge of platform 23 adjacent lip portion 22 of support 20 is arcuately beveled as at 68 permitting prompt advance of the can feed line as soon as gate 19 clears the leading can, even though support 20 may not have quite reached exact alignment with plate 17 and platform 23.

Having thus described the invention, what is claimed as novel and desired to be secured by Letters Patent of the United States is:

1. An article feeding device for supplying groups of cylindrical articles in side-by-side arrangement to packaging instrumentalities, which comprises means to feed a procession of cylindrical articles in side-by-side engagement, a platform positioned to receive a group of the articles at the leading end of said procession, means intermediate said conveyor and said platform to displace that article immediately rearward of said group from the path of advance of said procession and hold it in spaced relation from said group, and a conveyor means, operative while that article is held displaced and spaced from said group, to advance said group over said platform in a direction at right angles to the feed of said procession of articles.

2. An article feeding device for supplying a group of cylindrical articles and particularly flanged cans in side-by-side arrangement to packaging or like instrumentalities, said device comprising means defining a downwardly inclined path along which a procession of said articles are advanced, a platform positioned at the lower end of said path defining means to receive a group of articles at the forward end of said procession, stop means spaced from said path defining means in obstructive relation with the advance of said articles to control the number of articles which will be received as a group on said platform, means for displacing the article next adjacent said platform downwardly from said line of articles and spacing it from the adjacent article on said platform, and means for advancing the group of articles on said platform toward the packaging instrumentalities.

3. An article feeding device for supplying groups of cylindrical articles and particularly flanged cans in side-by-side arrangement for packaging or like instrumentalities, said device comprising a downwardly inclined conveyor for advancing a procession of said articles, a platform positioned adjacent the lower end of said conveyor to receive a group of articles comprising the forward end portion of said procession, stop means spaced from said downwardly inclined conveyor in obstructive relation with the advance of said articles to control the number of articles which will be received as a group on said platform, means disposed between said conveyor and said platform for displacing the article next adjacent said platform downwardly from said line of articles and spacing it from the adjacent article on said platform, and means for advancing the group of said articles on said platform therealong toward the packaging instrumentalities.

4. An article feeding device as in claim 3 wherein the means for displacing said adjacent article comprises a downwardly displaceable plate having one portion aligned with said conveyor and a second portion aligned with said platform in the upper position of said plate, and a gate member disposed above said displaceable plate and also spaced above the line of articles in its upper position, and further wherein means are provided for moving said gate member downwardly into engagement with the said adjacent article and displacing it downwardly from said line of articles as the plate is displaced and the displaced article is confined between the gate member and the plate.

5. An article feeding device as in claim 4 wherein means are provided for moving said gate member downwardly and laterally away from said platform to further assure spacing of the flanges of the displaced cans from the adjacent article on the platform.

6. An article feeding device as in claim 5 wherein the displaceable plate is pivotally mounted about an axis spaced from said gate member towards said conveyor, and further wherein tension springs connect said plate and said gate member.

7. An article feeding device as in claim 6 wherein means are provided for positively returning the plate to its upper position when the gate member is in its upper position, and further wherein the upper edge of said platform adjacent said plate is beveled to facilitate advance of the line of articles onto the platform.

8. An article feeding device as in claim 4 wherein the stop member and the gate member both have a length at least substantially coextensive with the length of said articles, said gate member and said stop member having surfaces parallel to said articles and laterally confining the group of articles.

9. An article feeding device as in claim 8 wherein the lower face of said gate member has a concave shape conforming to the shape of said cylindrical articles.

References Cited in the file of this patent

UNITED STATES PATENTS

| | | |
|---|---|---|
| 1,247,722 | Rogers | Nov. 27, 1917 |
| 1,654,706 | Schoen | Jan. 3, 1928 |
| 3,024,890 | Belk | Mar. 13, 1962 |